US005299055A

United States Patent [19]
Yoneyama

[11] Patent Number: 5,299,055
[45] Date of Patent: Mar. 29, 1994

[54] OPTICAL FIBER AMPLIFIER CIRCUIT COMPRISING A CONTROL CIRCUIT FOR CONTROLLING A PLURALITY OF EXCITATION LIGHT SOURCES

[75] Inventor: Kenichi Yoneyama, Tokyo, Japan

[73] Assignee: NEC Corporation, Tokyo, Japan

[21] Appl. No.: 936,843

[22] Filed: Aug. 28, 1992

[30] Foreign Application Priority Data

Aug. 28, 1991 [JP] Japan ................................. 2-215762

[51] Int. Cl.$^5$ ............................ G02B 6/28; H01S 3/30
[52] U.S. Cl. .................................. 359/341; 359/134; 359/345; 372/70
[58] Field of Search ............... 359/134, 160, 341, 345; 372/70, 71

[56] References Cited

U.S. PATENT DOCUMENTS

| | | | |
|---|---|---|---|
| 4,554,510 | 11/1985 | Shaw et al. | 359/345 |
| 4,963,832 | 10/1990 | Desurvire et al. | 359/341 |
| 5,003,268 | 3/1991 | Tsuchiya | 359/341 |
| 5,054,876 | 10/1991 | Grasso et al. | 359/345 |
| 5,128,601 | 7/1992 | Lanser et al. | 359/341 |

OTHER PUBLICATIONS

Pedersen et al. Optics Communications, vol. 81, #1.2, Feb. 1, 1991, pp. 23 & 25.
"Optical fiber amplifier module", Journal of the Institute of Electronics, Information and Communication Engineers, pp. 221–224, vol. 74, No. 3, Mar. 1990.

*Primary Examiner*—Nelson Moskowitz
*Attorney, Agent, or Firm*—Sughrue, Mion, Zinn, Macpeak & Seas

[57] ABSTRACT

In an optical fiber amplifier circuit comprising first through m-th excitation light sources generating first through m-th excitation lights, first through m-th driving circuits drive the first through the m-th excitation light sources, respectively. Each of first through m-th transducers are coupled to each of the first through the m-th excitation light sources and transduces a part of each of the first through the m-th excitation lights to first through m-th electrical signals. In response to the first through the m-th electrical signals, a control circuit supplies first through m-th control signals to the first through the m-th driving circuits to control the first through the m-th excitation light sources so that the first through the m-th excitation light sources generate the first through the m-th excitation lights having first through m-th output power ratios $1/A_1$ to $1/A_m$.

2 Claims, 2 Drawing Sheets

OPTICAL FIBER AMPLIFIER CIRCUIT COMPRISING A CONTROL CIRCUIT FOR CONTROLLING A PLURALITY OF EXCITATION LIGHT SOURCES

BACKGROUND OF THE INVENTION

This invention relates to an optical fiber amplifier circuit comprising a plurality of excitation light sources. The optical fiber amplifier circuit is particularly useful in an optical fiber communication system.

Recently, attention is paid to an optical fiber amplifier which uses an optical fiber doped with a rare-earth element, such as Neodymium or Erbium. Such an optical fiber amplifier is described in an article which is published by Kazunori Suzuki under the title of "Optical fiber amplifier module" in "The Journal of the Institute of Electronics, Information and Communication Engineers", pages 221–224, Vol. 74, No. 3, March 1990.

Such an optical fiber amplifier module comprises an Er(Erbium)-doped optical fiber, first and second excitation light sources, such as laser diodes, and first and second fiber couplers which are coupled to input and output sides of the Er-doped optical fiber, respectively. The first and the second excitation light sources generate first and second excitation lights, respectively. Each of the first and the second fiber couplers is of a wavelength division multiplexing type. The first fiber coupler receives input light and the first excitation light and multiplexes the input light and the first excitation light into first multiplexed light. The first multiplexed light is supplied to the Er-doped optical fiber. The Er-doped optical fiber absorbs the first excitation light and amplifies the input light and delivers amplified light to the second fiber coupler. The second fiber coupler multiplexes the amplified light and the second excitation light and supplies the second excitation light to the Er-doped optical fiber for obtaining high gain and high power amplification. The second fiber coupler delivers the amplified light to an output port as amplified output light.

It is desirable that the number of the excitation light sources is greater than two in order to improve amplification characteristic of the optical fiber amplifier module. However, if the optical fiber amplifier module comprises a plurality of excitation light sources which are greater than two in number, it is hard to control the respective excitation light sources. In other words, a control method of the plurality of excitation light sources is not yet established.

SUMMARY OF THE INVENTION

It is therefore an object of this invention to provide an optical fiber amplifier circuit comprising a control circuit which is capable of controlling a plurality of excitation light sources.

Other objects of this invention will become clear as the description proceeds.

On describing the gist of this invention, it is possible to understand that an optical fiber amplifier circuit includes an optical fiber amplifier which is for amplifying input light to produce amplified output light and which comprises an optical fiber doped with a rare-earth element and first through m-th excitation light sources for generating first through m-th excitation lights, where m represents a positive integer greater than unity, to supply the first through the m-th excitation lights to the optical fiber.

According to an aspect of this invention, the optical fiber amplifier circuit further comprises first through m-th driving circuits for driving the first through the m-th excitation light sources, respectively, first through m-th transducers coupled to the first through the m-th excitation light sources, respectively, each of the first through the m-th transducers being supplied with a part of each of the first through the m-th excitation lights and transducing the part of each of the first through the m-th excitation lights to first through m-th electrical signals having first through m-th signal values, and a control circuit connected to the first through the m-th transducers and the first through the m-th driving circuits for controlling the first through the m-th driving circuits in response to the first through the m-th electrical signals by supplying first through m-th control signals to the first through the m-th driving circuits, respectively. The first through the m-th excitation light sources thereby generate the first through the m-th excitation lights having first through m-th output power ratios.

DESCRIPTION OF THE PREFERRED EMBODIMENT

Figure 1:
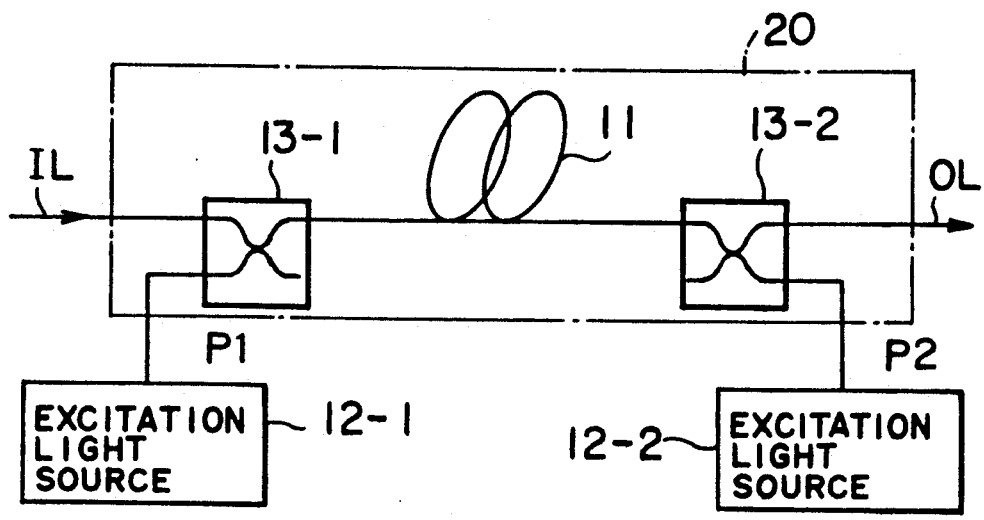
FIG. 1 is a block diagram of a first example of an optical fiber amplifier which is applied to this invention.

Referring to FIG. 1, description will be made as regards a first example of an optical fiber amplifier which is applied to this invention. The optical fiber amplifier amplifies input light IL and produces amplified output light OL. The optical fiber amplifier comprises an optical fiber 11 doped with a rare-earth element, such as Neodymium or Erbium, first and second excitation light sources 12-1 and 12-2, such as laser diodes, and first and second fiber couplers 13-1 and 13-2 which are coupled to input and output sides of the optical fiber 11, respectively. For convenience, the optical fiber 11 and the first and the second fiber couplers 13-1 and 13-2 will collectively be called a first amplifier section 20.

The first and the second excitation light sources 12-1 and 12-2 generate first and second excitation lights having first and second power values $P_1$ and $P_2$, respectively. Each of the first and the second fiber couplers 13-1 and 13-2 is of a wavelength division multiplexing type. The first fiber coupler 13-1 receives the input light IL and the first excitation light and multiplexes the input light IL and the first excitation light into a first multiplexed light. The first multiplexed light is supplied to the optical fiber 11. The optical fiber 11 amplifies the input light and delivers amplified light to the second fiber coupler 13-2. The second fiber coupler 13-2 multiplexes the amplified light and the second excitation light and supplies the second excitation light to the optical fiber 11. The second fiber coupler 13-2 produces the amplified light as the amplified output light OL.

Generally, the above-mentioned optical fiber amplifier is utilized in the form of a serial connection. Namely, a plurality of optical fiber amplifiers are connected in series. Although the optical fiber amplifier has a first combination of the first excitation light source 12-1 and the first fiber coupler 13-1 and a second combination of the second excitation light source 12-2 and the second fiber coupler 13-2, one of the first and the second combinations may be removed. As an example, when the optical fiber amplifier is supplied with the input light IL having a wavelength equal to 1.55 μm, the first excitation light source 12-1 generates the first excitation light having a wavelength equal to any one of 0.8 μm, 0.98 μm, and 1.48 μm. This applies to the second excitation light source 12-2.

Figure 2:
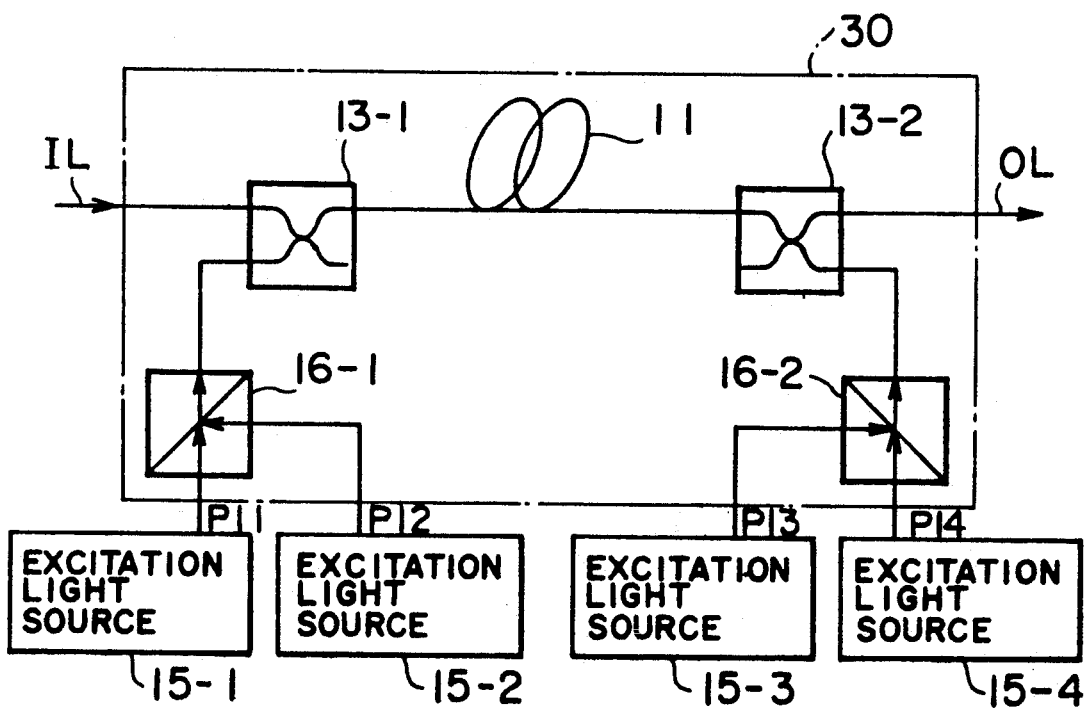
FIG. 2 is a block diagram of a second example of the optical fiber amplifier which is applied to this invention.

Referring to FIG. 2, description will proceed to a second example of the optical fiber amplifier which is applied to this invention. In addition to the optical fiber 11 and the first and the second fiber couplers 13-1 and 13-2, the optical fiber amplifier comprises first through fourth excitation light sources 15-1, 15-2, 15-3, and 15-4 and first and second multiplexers 16-1 and 16-2. For convenience, the optical fiber 11, the first and the second fiber couplers 13-1 and 13-2, and the first and the second multiplexers 16-1 and 16-2 will collectively be called a second amplifier section 30.

The first through the fourth excitation light sources 15-1 to 15-4 generate first through fourth excitation lights having first through fourth power values $P_{11}$, $P_{12}$, $P_{13}$, and $P_{14}$, respectively. Each of the first and the second multiplexers 16-1 and 16-2 is a polarization beam multiplexing type. The first multiplexer 16-1 multiplexes the first and the second excitation lights into a first multiplexed excitation light. The second multiplexer 16-2 multiplexes the third and the fourth excitation lights into a second multiplexed excitation light. The first fiber coupler 13-1 receives the input light IL and the first multiplexed excitation light and multiplexes the input light IL and the first multiplexed excitation light into the first multiplexed light. The first multiplexed light is supplied to the optical fiber 11. The optical fiber 11 amplifies the input light and delivers the amplified light to the second fiber coupler 13-2. The second fiber coupler 13-2 multiplexes the amplified light and the second multiplexed excitation light and supplies the second multiplexed excitation light to the optical fiber 11. The second fiber coupler 13-2 produces the amplified light as the amplified output light OL.

As mentioned in conjunction with FIG. 1, the illustrated optical fiber amplifier is generally utilized in the form of a serial connection.

Figure 3:
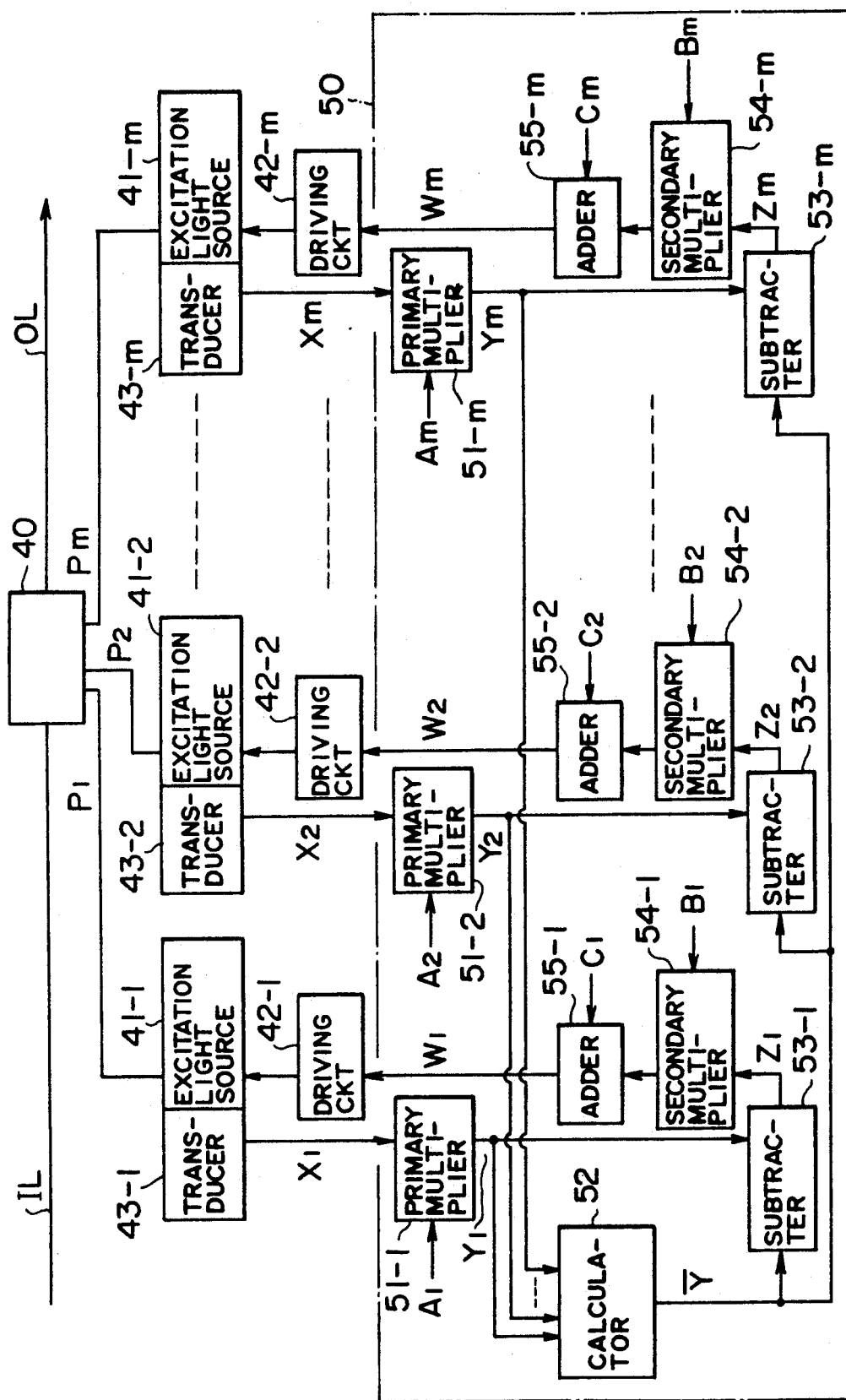
FIG. 3 is a block diagram of an optical fiber amplifier circuit according to a preferred embodiment of this invention.

Referring to FIG. 3, description will be made as regards an optical fiber amplifier circuit according to a preferred embodiment of this invention. The optical fiber amplifier circuit comprises an amplifier section depicted at 40. The amplifier section 40 comprises the first amplifier section 20 illustrated in FIG. 1 or comprises a plurality of first amplifier sections each of which is illustrated in FIG. 1 and which are connected in series. The amplifier section 40 may comprise the second amplifier section 30 illustrated in FIG. 2 or comprises a plurality of second amplifier sections each of which is illustrated in FIG. 2 and which are connected in series.

Under the circumstances, the optical fiber amplifier illustrated in FIG. 3 comprises first through m-th excitation light sources 41-$l$ to 41-$m$ for generating first through m-th excitation lights having first through m-th power values $P_l$ to $P_m$, where m represents a positive integer greater than unity. The first through the m-th excitation light sources 41-$l$ to 41-$m$ supply the first through the m-th excitation lights to the amplifier section 40.

First through m-th driving circuits 42-$l$ to 42-$m$ are connected to the first through the m-th excitation light sources 41-$l$ to 41-$m$ and drive the first through the m-th excitation light sources 41-$l$ to 41-$m$, respectively. First through m-th transducers, such as photodiodes, 43-$l$ to 43-$m$ are coupled to the first through the m-th excitation light sources 41-$l$ to 41-$m$, respectively. Each of the first through the m-th transducers 43-$l$ to 43-$m$ is supplied with a part of each of the first through the m-th excitation lights and transduces the part of each of the first through the m-th excitation lights to first through m-th electrical signals. For example, the first transducer 43-1 transduces the part of the first excitation light to the first electrical signal. The first through the m-th electrical signals have first through m-th signal values $X_l$ to $X_m$, respectively. A control circuit 50 is connected to the first through the m-th driving circuits 42-$l$ to 42-$m$ the first through the m-th transducers 43-$l$ to 43-$m$. As will shortly be described, the control circuit 50 is for controlling the first through the m-th driving circuits 42-$l$ to 42-$m$ in response to the first through the m-th electrical signals so that the first through the m-th excitation light sources 41-$l$ to 41-$m$ generate the first through the m-th excitation lights in an output power ratio of $1/A_l$: $1/A_2$: ... : $1/A_{m-1}$ : $1/A_m$. As a result, the first excitation light has a first output power ratio $1/A_l$ while the m-th excitation light has an m-th output power ratio $1/A_m$. A sum of the first through the m-th output power ratios $1/A_l$ to $1/A_m$ is equal to one.

The control circuit 50 comprises first through m-th primary multipliers 51-$l$ to 51-$m$ connected to the first through the m-th transducers 43-$l$ to 43-$m$ for multiplying the first through the m-th signal values $X_1$ to $X_m$ by first through m-th primary factors $A_l$ to $A_m$, respectively. The first through the m-th primary multipliers 51-$l$ to 51-$m$ produce first through m-th primary multiplied signals representative of first through m-th primary multiplied values $Y_l$ to $Y_m$. It is to be noted here that each of the first through the m-th primary factors $A_l$ to $A_m$ is a reciprocal of each of the first through the m-th output power ratios $1/A_l$ to $1/A_m$.

The control circuit 50 further comprises a calculator 52 connected to the first through the m-th primary multipliers 51-$l$ to 51-$m$ for calculating a mean value $\overline{Y}$ of the first through the m-th primary multiplied values $Y_l$ to $Y_m$. Namely, the calculator 52 carries out a calculation given by:

$$\overline{Y} = \frac{1}{m} \sum_{i=1}^{m} Y_i$$

The calculator 52 produces a mean value signal representative of the mean value $\overline{Y}$. First through m-th subtracters 53-$l$ to 53-$m$ are connected to the first through the m-th primary multipliers 51-$i$ $l$ to 51-$m$, respectively, and are connected to the calculator 52 and calculate first through m-th differences $Z_l$ to $Z_m$ between the mean value $\overline{Y}$ and the first through the m-th primary multiplied values $Y_l$ to $Y_m$ to produce first through m-th difference signals representative of the first through the m-th differences $Z_l$ to $Z_m$. For example, the first subtracter 53-1 calculates the first difference $Z_l$ between the mean value $\overline{Y}$ and the first multiplied value $Y_l$ and produces the first difference signal representative of the first difference $Z_l$. First through m-th secondary multipliers 54-/ to 54-$m$ are connected to the first through the m-th subtracters 53-/ to 53-$m$, respectively, and multiply the first through the m-th differences $Z_l$ to $Z_m$ by first through m-th secondary factors $B_l$ to $B_m$ which will later be described. The first through the m-th secondary multipliers 54-1 to 54-m produce first through m-th secondary multiplied signals representative of first through m-th secondary multiplied values. First through m-th adders 55-/ to 55-$m$ are connected to the first through the m-th secondary multipliers 54-1 to 54-m, respectively, and calculate first through m-th sums $W_l$ to $W_m$ of the first through the m-th secondary multiplied values and first through m-th set values $C_l$ to $C_m$, respectively, which will shortly be described. For example, the first adder 55-1 calculates the first sum $W_l$ of the first secondary multiplied value and the first set value $C_l$ and produces a first sum signal representative of the first sum $W_l$. The first through the m-th adders 55-/ to 55-$m$ deliver the first through m-th sum signals representative of the first through the m-th sums $W_l$ to $W_m$ as first through m-th control signals to the first through the m-th driving circuits 42-1 to 42-m, respectively.

In FIG. 3, the first excitation light source 41-1, the first transducer 43-1, the first primary multiplier 51-1, the first subtracter 53-1, the first secondary multiplier 54-1, the first adder 55-1, and the first driving circuit 42-1 forms a first feedback loop circuit. Similarly, the m-th excitation light source 41-$m$, the m-th transducer 43-$m$, the m-th primary multiplier 51-$m$, the m-th subtracter 53-$m$, the m-th secondary multiplier 54-$m$, the m-th adder 55-$m$, and the m-th driving circuit 42-$m$ forms an m-th feedback loop circuit. The first through the m-th feedback loop circuits have first through m-th loop time durations, respectively. The first through the m-th loop time durations may be called first through m-th loop time constant. The first through the m-th secondary factors $B_l$ to $B_m$ are set to first through m-th loop gains of the first through the m-th feedback loop circuits. It is desirable that each of the first through the m-th secondary factors is set taking each of the first through the m-th loop time constants into consideration. Each of the first through the m-th set values $C_l$ to $C_m$ is given by an initial set value of each of the first through the m-th power values $P_l$ to $P_m$.

As a typical example, the description will be made as regards operation of the m-th feedback loop circuit. In the m-th feedback loop circuit, the m-th excitation light source 41-$m$ generates the m-th excitation light. The m-th transducer 43-$m$ transduces the part of the m-th excitation light to the m-th electrical signal representative of the signal value $X_m$. The m-th primary multiplier 51-$m$ carries out a calculation given by:

$$Y_m = A_m \times X_m.$$

The m-th primary multiplier 51-m supplies the m-th primary multiplied signal representative of the m-th primary multiplied value $Y_m$ to the m-th subtracter 53-m.

As mentioned before, the calculator 52 calculates the mean value $\overline{Y}$ of the first through the m-th primary multiplied values $Y_l$ to $Y_m$. Supplied with the m-th primary multiplied value $Y_m$ and the mean value $\overline{Y}$, the subtracter 53-m carries out a calculation given by:

$$Z_m = \overline{Y} - Y_m.$$

The subtracter 53-m supplies the m-th difference signal representative of the m-th difference $Z_m$ to the m-th secondary multiplier 54-$m$.

The m-th secondary multiplier 54-$m$ carries out a calculation given by $B_m \times Z_m$ and delivers the m-th secondary multiplied signal representative of the m-th secondary multiplied value $B_m \times Z_m$ to the m-th adder 55-$m$. The m-th adder 55-$m$ carries out a calculation given by:

$$W_m = B_m \times Z_m + C_m.$$

In the example, the m-th secondary factor $C_m$ is given by the initial set value of the m-th power value $P_m$ as mentioned before. The m-th secondary multiplied value $B_m \times Z_m$ represents a correction value of the m-th power value $P_m$. The m-th adder 55-m supplies the m-th sum signal, as the m-th control signal, representative of the m-th sum $W_m$ to the m-th driving circuit 42-m. The above-mentioned operation is repeated until the m-th output power ratio converges to $1/A_m$. The first through an (m-−1)-th feedback loop circuits have same operation. As a result, the first through the m-th excitation light sources 41-/ to 42$m$ are controlled by the first through the m-th feedback loop circuits 42-/ to 42-$m$ so that the first through the m-th excitation light sources 41-/ to 41-$m$ generate the first through the m-th excitation lights having the first through the m-th output power ratios $1/A_1$ to $1/A_m$, respectively. Namely, the first through the m-th power values $P_l$ to $P_m$ converge to the output power ratio given by:

$$P_1 : P_2 : \ldots : P_m = 1/A_1 : 1/A_2 : \ldots : 1/A_m.$$

While this invention has thus far been described in conjunction with a preferred embodiment thereof, it will readily be possible for those skilled in the art to put this invention into practice in various other manners.

What is claimed is:

1. An optical fiber amplifier circuit including an optical fiber amplifier for amplifying input light to produce amplified output light and which comprises an optical fiber doped with a rare-earth element and first through m-th excitation light sources for generating first through m-th excitation lights, where m represents a positive integer greater than unity, and for supplying said first through said m-th excitation lights to said optical fiber, said optical fiber amplifier circuit further comprising:

first through m-th driving circuits for driving said first through said m-th excitation light sources, respectively;

first through m-th transducers coupled to said first through said m-th excitation light sources, respectively, each of said first through said m-th transducers being supplied with a part of each of said first through said m-th excitation lights and tansducing said part of each of the first through the m-th excitation light into first through m-th electrical signals having first through m-th signal values; and a control circuit connected to said first through said m-th transducers and said first through said m-th driving circuits for controlling said first through said m-th driving circuits in response to said first through said m-th electrical signals by supplying first through m-th control signals to said first through said m-th driving circuits, respectively, said first through said m-th excitation light sources thereby generating said first through said m-th excitation lights having first through m-th output power ratios, said control circuit comprising:

first through m-th primary multipliers connected to said first through said m-th transducers for multiplying said first through said m-th signal values by first through m-th primary factors, respectively, to produce first through m-th primary multiplied signals representative of first through m-th primary multiplied values;

a calculator connected to said first through said m-th primary multipliers for calculating a mean value of said first through said m-th primary multiplied values to produce a mean value signal representative of said mean value;

first through m-th subtracters connected to said first through said m-th primary multipliers, respectively, and connected to said calculator for calculating first through m-th difference between said mean value and said first through said m-th primary multiplied values to produce first through m-th difference signals representative of said first through said m-th differences;

first through m-th secondary multipliers connected to said first through said m-th subtracters for multiplying said first through said m-th differences by first through m-th secondary factors, respectively, to produce first through m-th secondary multiplied signals representative of first through m-th secondary multiplied values; and first through m-th adders connected to said first through said m-th secondary multipliers, respectively, for calculating first through m-th sums of said first through said m-th secondary multiplied values and first through m-th set values, respectively, to produce first through m-th sum signals, as said first through said m-th control signals, representative of said first through said m-th sums.

2. An optical fiber amplifier circuit as claimed in claim 1, said first through said m-th excitation lights having first through m-th power values, respectively, said first through m-th excitation light sources, said first through m-th transducers, said first through m-th primary multipliers, said first through m-th subtracters, said first through m-th secondary multipliers, said first through m-th adders, and said first through m-th driving circuits respectively forming first through m-th feedback loop circuits, wherein a ratio of aid first through said m-th primary factors is given by a ratio of reciprocals of each of said first through said m-th output power ratios, said first through said m-th secondary factors being first through m-th loop gains of said first through said m-th feedback loop circuits, respectively, each of said first through said m-th set values being given by an initial set value of each of said first through said m-th power values.

* * * * *

UNITED STATES PATENT AND TRADEMARK OFFICE
CERTIFICATE OF CORRECTION

PATENT NO. :     5,299,055
DATED      :     March 29, 1994
INVENTOR(S) :    Kenichi YONEYAMA It is certified that error appears in the above-identified patent and that said Letters Patent is hereby corrected as shown below:

On title page, item [30]

delete "2-215762" and insert --3-215762--.

Col. 6, line 22, delete "(m- -1)" and insert --(m-1)--.

Signed and Sealed this

Sixteenth Day of August, 1994

Attest:

BRUCE LEHMAN

Attesting Officer    Commissioner of Patents and Trademarks